(12) United States Patent
Heine

(10) Patent No.: US 6,327,279 B1
(45) Date of Patent: Dec. 4, 2001

(54) DEVICE FOR PUMP LIGHT SUPPLY FOR LASER ACTIVE AND AMPLIFYING FIBERS

(75) Inventor: Frank Heine, Mainhardt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/350,451

(22) Filed: Jul. 9, 1999

(30) Foreign Application Priority Data

Jul. 23, 1998 (DE) ............................................. 198 33 166

(51) Int. Cl.[7] ....................................................... H01S 3/30
(52) U.S. Cl. .................................. 372/6; 372/6; 372/72; 372/37; 385/134; 385/137; 385/147

(58) Field of Search ................................... 372/6, 72, 37; 385/134–137, 147

(56) References Cited

FOREIGN PATENT DOCUMENTS

WO 95/10868    4/1995   (WO) .

Primary Examiner—Leon Scott, Jr.
Assistant Examiner—Delma R. Flores Ruiz
(74) Attorney, Agent, or Firm—Michael J. Striker

(57) ABSTRACT

A device for loading of a light wave guide formed as a fiber with exciting energy in form of a pump light supply for producing a laser light has a fiber, such as a laser fiber and an amplifier fiber, which is wound with at least one winding in a coil-like manner for a transverse coupling of exciting pump light.

21 Claims, 2 Drawing Sheets

DEVICE FOR PUMP LIGHT SUPPLY FOR LASER ACTIVE AND AMPLIFYING FIBERS

BACKGROUND OF THE INVENTION

The present invention relates to a device for and a method of pump light supply for laser active and/or amplifying fibers.

For excitation of a laser light emission of a so-called fiber laser, two different possibilities are known. A so-called pump, or in other words an energy excitation can be provided either by a longitudinal or a transverse supply of excitation lights. For excitation of fiber lasers and fiber amplifiers exclusively longitudinal pumping is known. A basis for this is provided, in addition to other aspects, in the length-diameter ratio of the fibers. Since a fiber core typically is available over a diameter of at least 10 $\mu$m, therefore during a transverse pumping only an exceptionally low fraction of the pumping efficiency can be absorbed. For example a laser core with a diameter of 7 $\mu$m, (single-mode laser or amplifier for a utilization with 1 $\mu$m wave length) absorbs during a single-time passage only substantially between 0.1% and 1% of the pump power, and this fraction depends on an ion doping concentration of the fiber laser or amplifier.

Also, a method of longitudinal coupling of the pump light in the laser core, in particular for high power fiber laser and amplifier, is known with output conductors of several watts. Since the radiation quality of the pump laser diodes for a direct coupling of the pump power in the region doped with a laserion (so-called single-mode region) of the fiber is not sufficient, high light powers must be realized only through fibers with multiple cores.

Patent document WO 95 10868 shows a method for a repeated supply of pump light in so-called double core fibers. The fibers are composed of multiple cores which are arranged coaxially with one another. In one pump core with a typical diameter of 100 $\mu$m–400 $\mu$m, the power of the laser diodes is coupled. The diameter of the pump core has a plurality of diameters of the single mode laser cores, typically between 5 $\mu$m and 10 $\mu$m. Advantageous for the double core fibers when compared with conventional pump technique, is the possibility to realize fiber lasers with only one occurring spacial mode of the irradiated laser light, as well as a very high pump light aperture and pump light coupling surface.

The disadvantage of the known double core method is the expensive and complicated and therefore cost intense manufacture of the multiple core fibers. Since the fibers additionally must be optimized, for example with respect to polarization preservation and a radiation strength, there are limitations with respect to the materials to be used for the fibers. In the pump core the occurring radiation modes which have no spacial overlapping with the laser core must be suppressed. This can be performed by spacial winding technique or pump core geometries. Moreover, the known double core techniques for a beam formation of the laser diodes are technically expensive and have the risk of insufficient reliability, which in many applications, for example for space applications can be problematic. In addition, a simultaneous coupling of signal and pump sources is required in a double core fiber for amplifier applications of a wave-length-selective coupling, whereby typically power losses occur up to 50%.

SUMMARY OF THE INVENTION

Accordingly, it is an object of present invention to provide an arrangement for and a method of a transverse pump light supply for laser active fibers and/or amplified fibers, which avoids the disadvantages of the prior art.

In keeping with these objects and with others which will become apparent hereinafter, one feature of present invention resides, briefly stated in a device for loading of a light wave guide formed as a fiber with exciting energy in form of a pump light supply for producing a laser light, which has a fiber selected from a group consisting of a laser fiber and an amplifier fiber which is wound with at least one winding in a coil-like manner for a transverse coupling of exciting pump light.

Another feature of present invention resides in a method of loading of a light wave guide formed as a fiber laser for producing a monochromatic laser light for amplifying a coherent or an incoherent signal light, comprising the steps of providing a coil-like wound fiber, using as an excitation energy a pump light, and regulating the pump light transversely into the coil-like wound fiber.

When the device is designed and a method is performed in accordance with the present invention, they have the advantage of a high power output with the utilization of relatively simple and therefore cost-favorable fibers with simultaneously very low losses. The utilization of relatively expensive and thereby cost-intense double core fibers can be dispensed with. In addition, the inventive device and method have the advantage of a high output power with a low energy consumption and low losses, and thereby a very high efficiency.

Due to the possibility of a redundant coupling of a plurality of laser diodes, which each must have only a relatively low radiation quality, there is a high fault safety and thereby an exceptionally high reliability of a whole system. The laser diode for producing and supplying of the pump light can be coupled therefore in a structurally very simple manner directly to a pump chamber. Thereby there are no difficulties due to a coupling of the jet-shaped laser diodes in the fibers. In addition, an easily available amplifier and laser fibers can be engaged without problems. In contrast to the known longitudinal pump systems, the fiber ends of the laser and/or amplifier fibers are freely accessible, which substantially improves the possibilities for use. The advantage with regard to the known double core fibers is a considerable increase of the surface available for joining in a transversal coupling of the pump light.

It is also advantageous that it is simple to produce an intermediate space between two receiving parts for receiving a tangential supplied fiber, for example by grinding-in. Very low requirements are made to the quality of the surface which is surrounded by the fiber, which is very cost-favorable for manufacture.

In accordance with a preferable embodiment, a fine adjustment of a width of the intermediate space which receives the fiber is possible by an axial displacement of a corresponding conically shaped inner and outer cylinder, which provides an exact adaptation to the diameter of the fiber.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2*b* is a view schematically showing a further embodiment of the arrangement corresponding to FIG. 2*a.

DESCRIPTION OF PREFERRED EMBODIMENTS

Figure 1A:
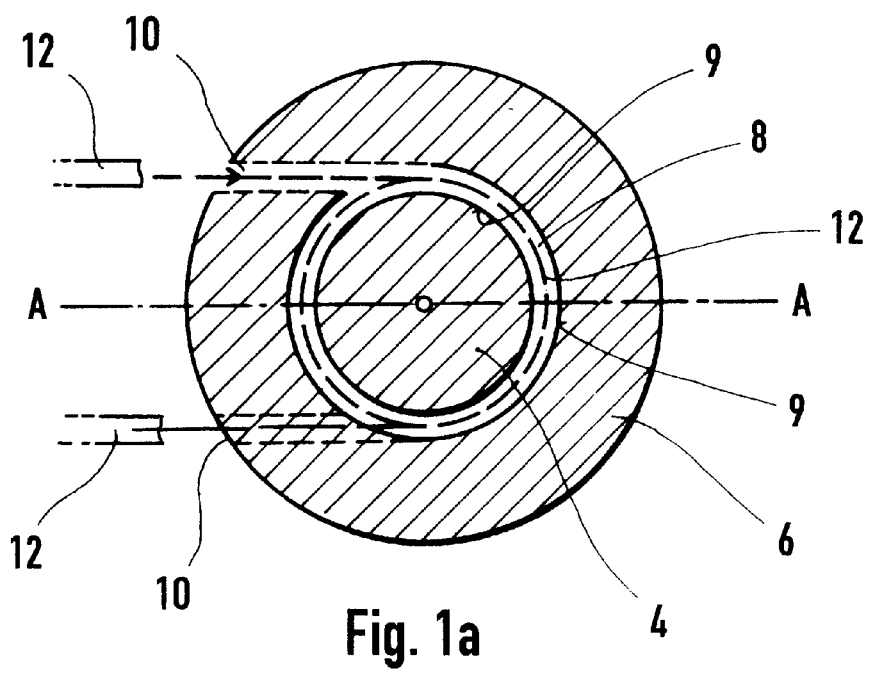
FIG. 1a is a view showing a schematic cross-section of a device for receiving a fiber with a transverse coupling of a pump light.

FIG. 1 shows two schematic views of an arrangement of a single mode fiber 12, which has a suitable concentration of laser active ions, such as for example neodym, ytterbium, erbium, or a suitable combination of the same, in a single mode core. The single mode or mono mode fiber 12 is inserted in a pump chamber which is formed by two coaxially arranged cylinders, so that a wound arrangement of the fiber 12 with at least one winding is produced. The device therefore can serve both for producing a laser light which must be irradiated through the fiber 12, and/or the amplification of a signal light guided through the fiber 12. FIG. 1*a* shows a schematic cross-section of a device for a transverse coupling of the pump light in the fiber 12. The fiber 12 provided with a suitable doping is wound on an inner cylinder which is identified herein below as the inner cylinder 4. The inner cylinder 4 is surrounded by an outer cylinder 6. The outer diameter of the inner cylinder 4 is smaller than the inner diameter of the outer cylinder 6, so that a uniform intermediate space 8 is produced and formed as a ring gap. It forms the pump chamber.

The intermediate space 8 amounts only to less than 10 $\mu$m and must be designed with respect to the dimensioning so that a transverse supplied laser/amplifier fiber 12 (subsequently called the fiber 12) can be inserted without mechanical loads, or in other words with consideration of the minimal permissible bending radius and the relevant fiber diameter. Simultaneously, only a small intermediate space must remain between the individual windings of a coil-like wound fiber 12, as shown in FIG. 1*a* in the plane of the drawings. At least two openings are provided in the outer cylinder 6. They have fiber supplies which tangentially open into the intermediate space 8. They have an insignificantly greater diameter than the fiber 12 to be passed through them. Preferably, this diameter corresponds to the thickness of the intermediate space 8.

The side surfaces of the intermediate space 8 which is formed by the outer surface of the inner cylinder 4 and the inner surface of the outer cylinder 6, are highly reflective due to the use of a dielectric or metallic coating 9 for an excitation light (pump light).

Figure 1B:
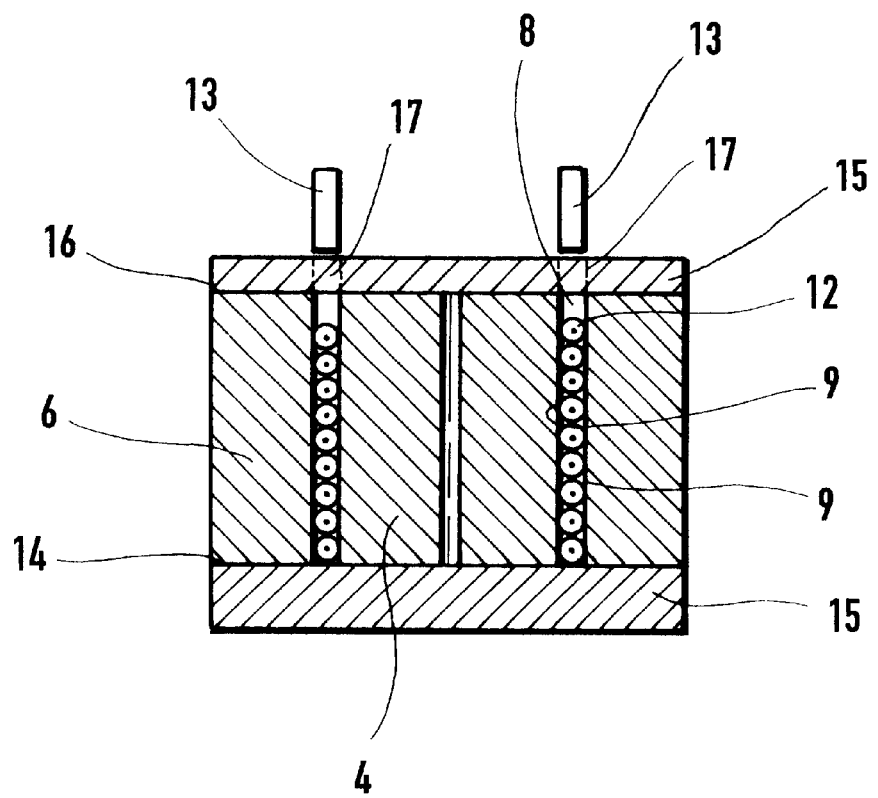
FIG. 1*b* is a schematic longitudinal section in a sectional plane A—A corresponding to FIG. 1*a;*

FIG. 1*b* shows a schematic longitudinal section in a sectional plane A—A of the device of FIG. 1*a*. Here the doped laser/amplifier fiber 12 which is wound in several windings is shown. The intermediate space 8, as shown in the illustrated embodiment, can be closed upwardly or downwardly also by the highly reflected coatings 14, 16.

The coupling of the pump radiation is performed through openings 17 having a suitable diameter and provided in the coatings 14, 16 and in the upper and lower plates 15 which close the device, for example by shown laser diodes 13. The openings 17 can be produced for example by a mask technique, etching technique or laser ablation.

A plurality of laser diodes 13 are arranged on the periphery of the gap (intermediate space 8). The laser diodes 13 are coupled through the openings 17 and the inner space 8 which serves as a pump chamber. The coupling can be performed either by a not shown transporting fiber or by a free radiation operation. In correspondence with the number and the power of the laser diode, a pump power can be coupled in the fiber 12.

The fiber 12 is located, as a coil with at least one, but preferably a number of windings, in the intermediate space 8. The pump light supplied by the laser diodes 13 passes through the fiber. Because of the reflective coatings 9, the light passes through the windings of the fiber 12 many times. Thereby a weak absorption is sufficient for supplying the fibers 12 with the pump light (excitation light).

The supplied pump power makes available a cavitation, so that via required multiple reflections, the required multiple radiations (corresponding to the number of the windings) can be realized for absorption of the pump light in the fiber 12. In addition, the special arrangement of the fiber 12 provides an increase of the doped region which is irradiated through by the device during a passage of the pump light. For example with the fiber length of 10 m and an average diameter of the fiber winding of 30 mm, approximately 100 fiber layers (windings) are provided. This means with the fiber core diameter of 7 $\mu$m, approximately 0.7 mm of the irradiated through absorbing material.

The intermediate space 8 which receives in the fiber 12 can be easily produced by conventional technique, such as for example grinding-in, in particular since requirements for the surface quality are relatively low. The coating 9, and respectively 14 and 16 of the cylinders 4 and 6 can be produced both from a vapor phase and also from a liquid deposition, for example by a metalization.

FIG. 2 shows in schematic cross sections further embodiments of the inner and outer cylinder surrounded by the single mode fiber. The same parts as in FIG. 1 are identified with the same reference numerals.

Figure 2A:
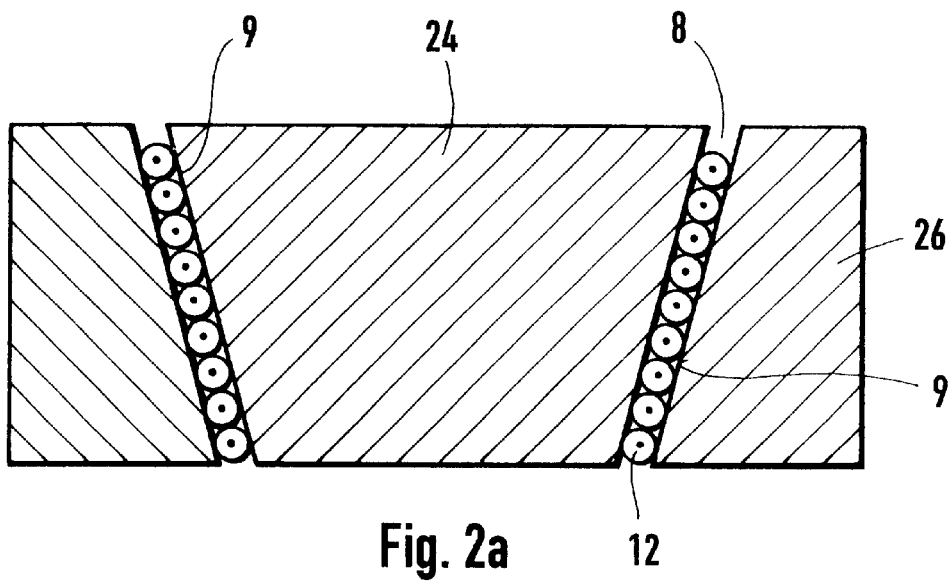
FIG. 2*a* is a view schematically showing a cross-section of the further embodiment of the device corresponding to FIG. 1.

FIG. 2*a* shows a schematic cross-sectional view of a further embodiment of the pump light supply of FIG. 1. Here the intermediate space 8 is formed conically. When a truncated cone 24 is inserted, the width of the intermediate space relative to an inner surface of the hollow outer cylinder 26 can be varied so as to adjust directly to the diameter of the fiber 12. The fiber 12 can be supplied through the suitably arranged openings or depression in the base plate or in the outer cylinder 26 and also exit there.

Figure 2B:
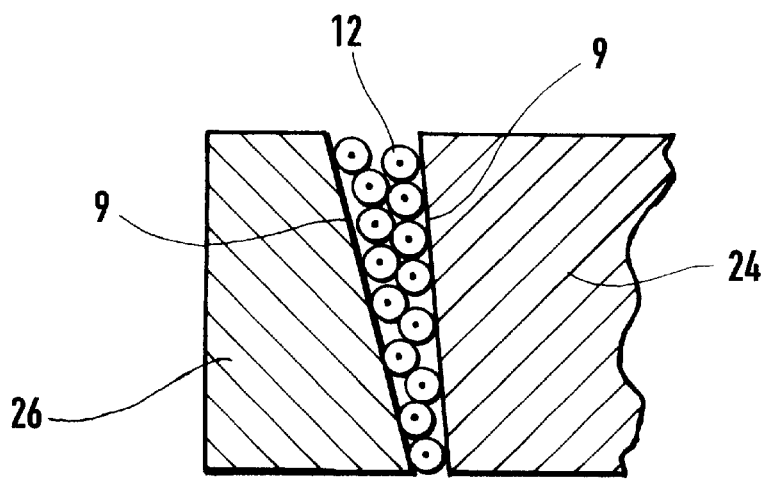

FIG. 2*b* shows in a schematic cross-section a further embodiment of the pump light supply corresponding to FIG. 2*a*. Here however the outer surface of the truncated cone 24 and the inner surface of the outer cylinder 26 are not parallel to one another, so that due to the different conicity, a changeable gap width of the intermediate chamber 8 is produced. This means that the inner surface of the outer cylinder 26 has a greater conicity than the outer surface of the truncated cone 24. In this way, a non uniform winding is provided with the upwardly more and denser packed windings of the fiber 12.

Figure 3:
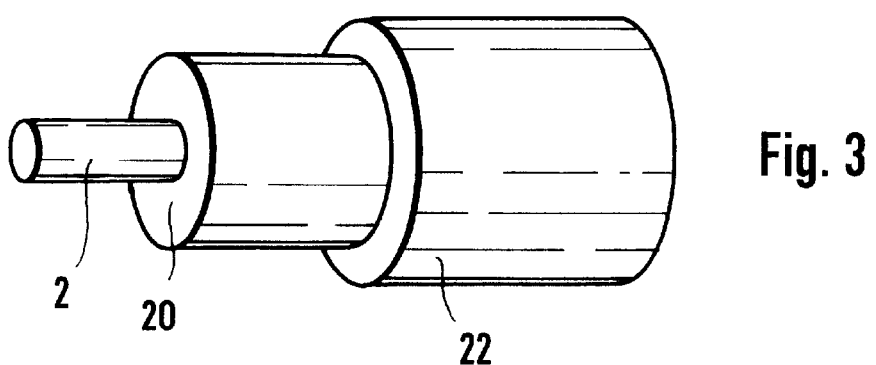
* and FIG. 3 is a view showing a double core fiber of a conventional construction.

FIG. 3 shows, for illustration of the differences of a longitudinal pump light supply, a known single mode fiber. It is composed of an inner doped core or single mode fiber 2, a surrounding pump core 20 or the casing fiber as well as a protective casing 22 which surrounds the casing fiber.

It will be understood that each of the elements described above, or two or more together, may also find a useful application in other types of constructions differing from the types described above.

While the invention has been illustrated and described as embodied in device for pump light supply for laser active and amplified fibers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for loading a light wave guide formed as a fiber with exciting energy in form of a pump light supply for producing a laser light, comprising a fiber selected from a group consisting of a laser fiber and an amplifier fiber which is wound with at least one winding in a coil-like manner for a transverse coupling of exciting pump light.

2. A device as defined in claim 1, wherein said fiber is formed for producing a monochromatic laser light.

3. A device as defined in claim 1, wherein said fiber is formed for amplification of coherent and incoherent signal light.

4. A device as defined in claim 1, wherein said fiber is formed so that a light emitted by said fiber has only a spatial mode.

5. A device as defined in claim 1, wherein said fiber has a diameter of between 4 and 10 µm.

6. A device as defined in claim 1; and further comprising a body on which said fiber is wound in a coil-like manner.

7. A device as defined in claim 6, wherein said body is an inner cylinder.

8. A device as defined in claim 6, wherein said body is a truncated cone with a slightly conical outer diameter.

9. A device as defined in claim 7; and further comprising a hollow outer cylinder having a cylindrical inner surface and surrounding said inner cylinder with the wound fiber.

10. A device as defined in claim 8; and further comprising an outer cylinder having a slightly conical inner surface and surrounding said truncated cone with the wound fiber.

11. A device as defined in claim 10, wherein said truncated cone has an outer surface which has a same conicity as an inner surface of said outer cylinder.

12. A device as defined in claim 10, wherein said truncated cone has an outer surface which has a smaller conicity than an inner surface of said outer cylinder.

13. A device as defined in claim 9, wherein said inner cylinder and said outer cylinder are provided at end sides with a reflective layer.

14. A device as defined in claim 8, wherein said truncated cone and said outer cylinder are provided at an end side with a reflective layer.

15. A device as defined in claim 1, wherein said body has an inner cylinder; and further comprising an outer cylinder surrounding said inner cylinder and forming an intermediate space therebetween, said inner cylinder and said outer cylinder having surfaces facing said inner space and provided with a reflecting layer.

16. A device as defined in claim 10, wherein said truncated cone and said outer cylinder form an intermediate space therebetween and have surfaces facing said space which are covered with a reflective layer.

17. A device as defined in claim 1, wherein said body is formed as an inner cylinder; and further comprising an outer cylinder which surrounds said inner cylinder and forms an intermediate space therebetween, said outer cylinder having at least one opening which opens tangentially in said intermediate space for supply of said fiber.

18. A device as defined in claim 17, wherein said outer cylinder has another opening which opens in said intermediate space for withdrawing said fiber from said chamber.

19. A device as defined in claim 1, wherein said fiber is doped with rare earth ions.

20. A device as defined in claim 19, wherein said ions are ions selected from the group consisting of neodym ions, ytterbium ions, erbium ions, and a combination thereof.

21. A method of loading of a light wave guide formed as a fiber laser for producing a monochromatic laser light for amplifying a coherent or an incoherent signal light, comprising the steps of providing a coil-like wound fiber; using as an excitation energy a pump light; and radiation the pump light transversely into the coil-like wound fiber.

* * * * *